April 4, 1972   N. WALLER   3,654,054
KNITTED FABRIC WITH PROJECTING BARBS
Filed Aug. 22, 1969   12 Sheets-Sheet 1

Inventor:
Norbert WALLER
by: Arthur O. Klein
ATTORNEY

April 4, 1972   N. WALLER   3,654,054
KNITTED FABRIC WITH PROJECTING BARBS
Filed Aug. 22, 1969   12 Sheets-Sheet 5

Inventor:
Norbert WALLER
by Arthur O. Klein
ATTORNEY

April 4, 1972 N. WALLER 3,654,054
KNITTED FABRIC WITH PROJECTING BARBS
Filed Aug. 22, 1969 12 Sheets-Sheet 10

Inventor:
Norbert WALLER
by: Arthur O. Klein
ATTORNEY

United States Patent Office 3,654,054
Patented Apr. 4, 1972

3,654,054
KNITTED FABRIC WITH PROJECTING BARBS
Norbert Waller, Weil im Schonbuch, Germany, assignor to Gottlieb Binder Holzgerlingen, Baden-Wurttemberg, Germany
Filed Aug. 22, 1969, Ser. No. 852,295
Int. Cl. D04b 21/02
U.S. Cl. 161—48                                             4 Claims

ABSTRACT OF THE DISCLOSURE

A knitted fabric consisting of a base fabric into which while being knitted a supplementary monofilament thread of a thermoplastic material is knitted so as to form loops which are drawn out to a considerable length and are then set by a heat treatment and erected to an upright position relative to the base fabric either by stretching the latter or by means of special hook-shaped tools around which these loops are layed, whereupon these set and erected loops are fixed by a sizing material and are then cut open to form barbs with narrow heads which, when the entire fabric is pressed together with another pile fabric, become hooked together with this other fabric.

---

The present invention relates to a knitted fabric which comprises a base fabric into which monofilament threads of a thermoplastic material are knitted so as to form plush or terry loops which are then set and cut open so as to form barb-shaped fastener elements on one face of the base fabric which may penetrate into and be hooked together with the uncut pile of another fabric when the two fabrics are applied face-on-face upon each other, and may be severed from the uncut pile of the second fabric when the two fabrics are ripped with such a force off each other that the barbs will be unbent.

The only textiles with such projecting barbs which prior to this invention proved satisfactory in actual practice were made by weaving. While such a fabric is being woven of a thread of a thermoplastic material, the plush loops are formed by means of metal wires and are thereafter set and cut open to form barbs. These known woven fabrics with projecting barbs have, however, the disadvantage that their production is relatively expensive and that the finished fabric is nonelastic and relatively stiff and also of a considerable thickness and that therefore this fabric can be employed only for certain types of garments or other articles.

These disadvantages of woven fabrics with projecting barbs rendered it desirable to employ a conventional knitted fabric and to knit monofilament threads of a thermoplastic material into this fabric so as to form plush loops which when set and cut open will form barbs. Such a knitted fabric with projecting barbs will, however, not form a satisfactory fastener element since the monofilament threads when being bent in the normal knitting operation will form loops the closed curved ends of which from which the barbs are made have a relatively large radius of curvature and therefore a width which amounts to about 70% of the length of these loops. Due to this large radius of the parts of the plush loops from which the barbs are made on one fabric, these barbs will not properly penetrate into the uncut pile of the other fabric which is to be fastened together with the first fabric. If, however, one or another of these barbs should penetrate into and be hooked together with the uncut pile of the other fabric, this barb may be bent open by a relatively small force because of its large radius of curvature. Furthermore, the plush loops of the known kinds of knitted plush fabrics do not stand upright from the surface of the base fabric but extend at an acute angle thereto. Only if these loops are very close adjacent to each other, they will be held in a more upright position because they cannot lie down. However, a fabric with such closely adjacent loops which are cut so as to form barbs is very inefficient as a fastener since the individual barbs will rarely penetrate into the uncut pile of the second fabric. If the loops are not as close to each other and are in an inclined position, the latter will be pressed back against the base of the first fabric when the two fabrics are pressed against each other and therefore most of the barbs will not enter and be hooked together with the uncut pile of the second fabric.

It is an object of the present invention to provide a knitted fabric with upwardly projecting barbs which, when applied upon a fabric with an uncut pile will be fastened together with the latter at least as securely as if these fabrics were woven, but has the advantages of a knitted fabric of being more quickly produced than a woven fabric and of being elastic at least in one direction.

According to the present invention this object may be attained by providing the plus loops when set in the form of long-drawn loops which are erected to an upright position and the heads of which are drawn to a narrow width and therefore have a small radius so that after being cut open, they form the desired barbs. These narrow barbs of the first fabric may then easily penetrate into and be hooked together with the uncut pile of the second fabric. These barbs which are formed by the narrow heads have the further advantage that, because of the small radius of curvature of the heads, it requires a much greater force to unbend the hooks than that which would be required if the loops have the normal width and are not long-drawn as in a normal plus fabric. Therefore, the barbs on one fabric which are hooked together with the uncut pile of the other fabric insure that the two fabrics will be very securely fastened to each other. Since they are formed by upwardly projecting plush loops, the barbs will reliably engage into the uncut pile of the second fabric.

The knitted fabric according to the invention may be produced by several different methods.

One of these methods which forms another feature of the invention consists of the steps of combining a knitted one-face base fabric with a supplemental knitted part which consists of monofilament thermoplastic threads and forms long-drawn loops, so that both fabric parts together form a wavy shape, of then stretching this wavy material in the longitudinal direction of the wales and simultaneously setting the stretched long loops, of then exposing the heads of the long-drawn loops by a special procedure, and after they have been erected to form plush loops by an additional stretching operation and a simultaneous dressing with a sizing material, then cutting open these loops so as to form barbs.

This new method may be carried out on a knitting machine which is provided with two needle systems or on a warp knitting machine which is provided with two needle bars.

Another method of knitting the fabric according to the invention consists in knitting the looped fabric in such a manner by means of a warp knitting machine which is provided with only one needle bar that the weft parts of the combined pillar-stitch and weft insertion are layed around loop holders of the machine which are provided for forming long-drawn loops and are located outside of the row of needles and act during the period in which several courses are knitted, and that while the loop holders engage into the long-drawn loops, these loops are set. Therefore, by employing the loop holders which act during the period of knitting several courses, the loops which are drawn out by the loop holders may be set while the fabric is still being knitted.

The present invention also concerns the development of two different apparatus for carrying out the last-mentioned knitting method. One of these apparatus consists according to the invention in providing a loop holder for each loop which is to be drawn but in the form of a setting hook, and in providing for the space between each pair of adjacent needles an endless row of setting hooks which are guided in such a manner that during the formation of several courses these setting hooks will be taken along by the long-drawn loops so that the distance between the adjacent setting hooks is gradually increased. This produces the result that while the knitting operation proceeds the setting hooks which engage into the long-drawn loops will move for a certain length of time along with the base fabric so that during this period those loops may be set which have been drawn out by the setting hooks. This apparatus may be mounted in a very simple manner on any knitting machine of a conventional type.

The second apparatus according to the invention for carrying out the last-mentioned knitting method is provided with loop holders in the form of flat metal parts or "lancets" which are held by the long-drawn loops of the knitted fabric within a row between two adjacent wales of the base fabric and each of which, in turn, extends within a plane which is directed vertical to the base fabric between two adjacent needles of the needle bar. This apparatus is further provided with two lancet holding devices which alternate in acting on the lancets and the first of which engages with the upper ends of the lancets and embraces them laterally and also holds them in vertical directions when the old loops are being knocked over, while the second holding device which is located underneath the first device serves for holding the lancets laterally during the remainder of the time. This apparatus may likewise be easily mounted on any conventional knitting machine. By providing the first device which holds the lancets while the old loops are being knocked over by engaging with their upper ends and also embracing them laterally, the lancets which are held by the surrounding loops are prevented from being pulled downwardly by the base fabric when the latter moves downwardly while the loops are knocked over. The second holding device which is located underneath this first holding device and alternately to the latter engages with the lancets for holding the same in lateral directions during the remainder of the time is provided for permitting each weft part, which is looped around a lancet above the first holding device for forming a long-drawn loop, to slip downwardly past both lancet holding devices. Therefore, both lancet holding devices together prevent any movement of the lancet.

The features and advantages of the present invention will become more clearly apparent from the following detailed description thereof which is to be read with reference to the accompanying drawings, in which—

FIG. 24 shows a pattern for knitting the fabric as shown in FIG. 23; while

Figure 1:
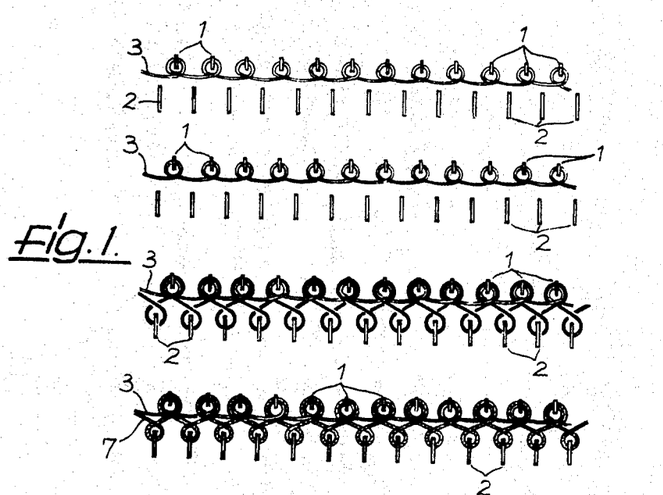
FIG. 1 shows a pattern for knitting a fabric from which by the removal of a thread the latter will be converted in accordance with the invention.
Figure 2:
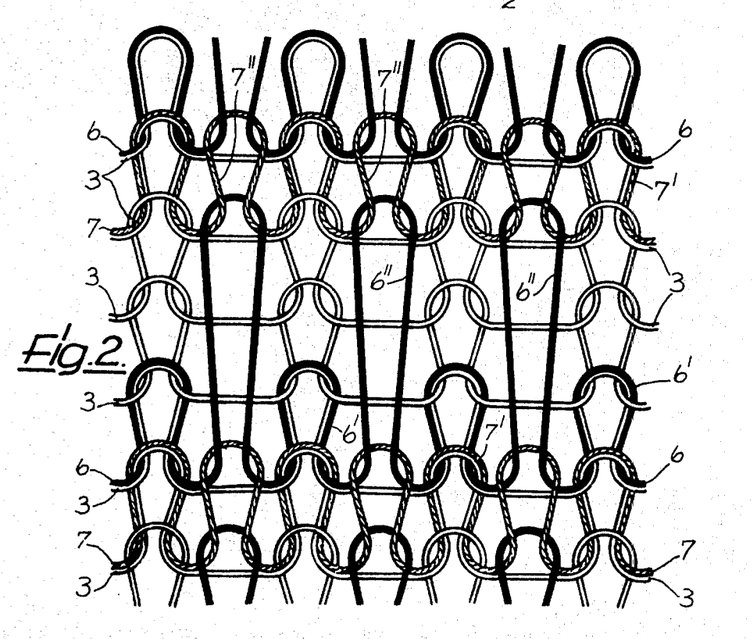
FIG. 2 shows diagrammatically a loop formation of the knitted fabric which is produced in accordance with the pattern as shown in FIG. 1.
Figure 3:
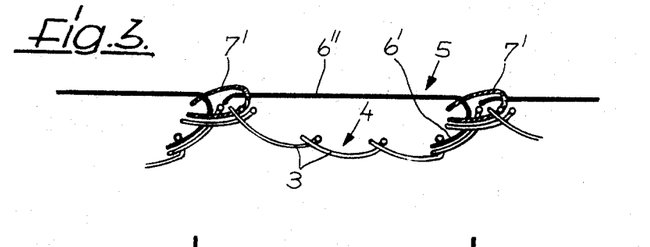
FIG. 3 shows a diagrammatically simplified cross section which is taken along the wales of the fabric as shown in FIG. 2.
Figure 4:
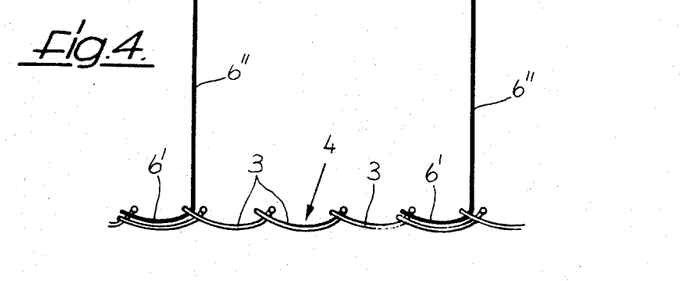
FIG. 4 shows a cross section similar to that according to FIG. 3 of the fabric as shown in FIG. 2 after the removable threads have been removed.

In the drawings, FIG. 1 illustrates a pattern in which the dial needles which are guided in the grooves of the dial of a circular knitting machine are designated by the numeral 1, while the cylinder needles which are guided in the grooves of the cylinder are designated by the numeral 2. A first thread 3 which is of a multifilament type is employed for knitting on the dial needles 1 a uniform one-face base fabric 4 as shown in FIGS. 3 and 4 which is connected to a supplementary fabric part 5 (FIG. 3) which consists of a second thread 6 which is of a monofilament type and consists of a thermoplastic, and of a removable thread 7. Both threads 6 and 7 are connected by means of the dial needles to the base fabric 4 and thereby form normal loops 6′ and 7′ which are disposed within the wales of the base fabric. The wales of the supplementary fabric part 5 which are formed by means of the cylinder needles 2 are disposed between the adjacent wales of the base fabric, and the second type of thread 6 then forms long-drawn loops 6″ which extend over three courses of the base fabric. The successive long-drawn loops 6″ of the second thermoplastic type of threads 6 within each wale of the supplementary fabric part 5 are connected to each other by the normal loops 7" of the removable thread 7. This results in the formation of a wavy fabric as may be seen especially in FIG. 3, in which the base fabric 4 forms the wave crests which are curved by the long-drawn loops 6" of the supplementary fabric part 5. FIG. 2 illustrates diagrammatically the loop formation of a knitted fabric which is thus produced and in which the back of the base fabric and the face of the supplementary fabric part may be seen. FIG. 2 also shows very clearly that between two adjacent wales containing long-drawn loops 6", loops 7' are formed on the dial needles 1. The loops 7" which are formed of the removable thread 7 reduce the width of the heads of the long-drawn loops 6".

After being thus produced, the fabric is stretched in the longitudinal direction of the wales. This has the result, as shown very clearly in FIG. 3, that the longdrawn loops 6" of the second or thermoplastic type of thread 6 will be stretched and, due to their being tied to the loops 7" of the removable thread 7, especially their heads will be drawn so as to have a rather narrow width which is of great importance for forming the barbs in accordance with the invention. When the long-drawn loops of the second or thermoplastic type of thread are in this stretched position, these threads are set by first being heated and subsequently cooled. Thereafter the removable threads 7 are removed in a manner which is conventional in this art. As may be seen particularly in FIG. 2, this removal of the threads 7 results in the exposure of the heads of the long-drawn loops 6". Due to the fact that the loops of the first kind of thread 3 of the base fabric 4 then engage with the feet of the longdrawn loops 6", the latter will tend to turn to an upright position, as indicated diagrammatically in FIG. 4. For insuring that these loops 6" will be erected to such an upright position, the pile fabric which is thus produced is stretched once more to such an extent that these loops which then form plush loops will be disposed at the desired angles. Thereafter, these loops 6" will be fixed in this upright position by being dressed with a sizing material and will then be cut open at one side so as to form barbs. This cutting operation may be carried out in the manner which is conventional in woven fabrics of this type and therefore does not need to be further described. For increasing the elasticity of the knitted fabric, the base fabric 4 may be composed of two different kinds of first threads 3, one of which is elastic, while the other is nonelastic. The nonelastic threads 3 are then employed for those courses in which the normal loops 6' of the thermoplastic second kind of thread 6 are formed so that the nonelastic kind of thread 3 of the base fabric 4 will be securely tied together with the thermoplastic barb-forming second kind of thread 6 and the barbs which are formed by the long-drawn loops 6" will thus be firmly anchored in the base fabric 4.

Figure 5:
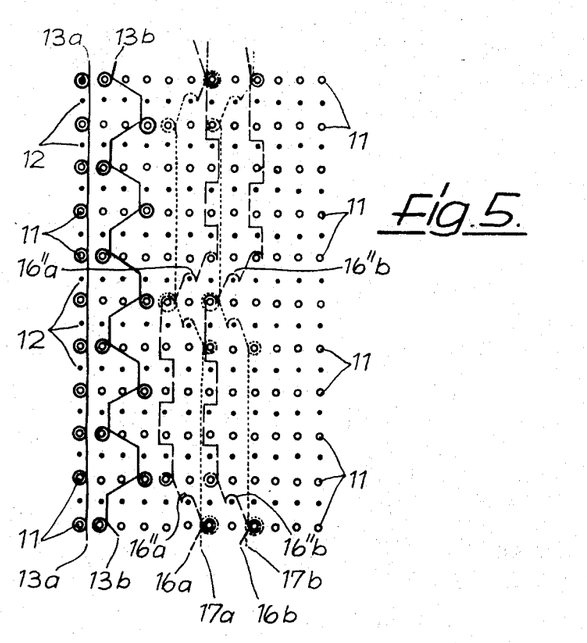
FIG. 5 shows a pattern for knitting a fabric from which by the removal of certain threads another fabric may be produced in accordance with the invention.

A similar fabric of a wavy shape may also be knitted in accordance with the pattern as shown in FIG. 5 by means of a warp knitting machine which is provided with two needle bars. A base fabric is also produced in this case of a first multifilament kind of thread by means of the needles 11 of the first needle bar of the machine. This base fabric comprises a pillar-stitch 13a and a second thread 13b of the same kind which connects two wales to each other. By means of the needles 11 of the first needle bar and the needles 12 of the second needle bar the machine further produces a supplementary fabric part which is composed of threads 16a and 16b of the second monofilament thermoplastic type and of removable threads 17a and 17b. In this supplementary fabric part the long-drawn loops 16" are formed by omitting to lay the threads 16a and 16b around the needles 12 of the second needle bar and by stopping the operation of the second pressure bar. This may also be effected by stopping the operation of the second needle bar which results in the formation of the long-drawn loops. The removable threads 17a and 17b form in either of these cases entirely normal loops which are knitted by the needles 11 of the first needle bar in the form of closed loops into the base fabric and by the needles 12 of the second needle bar in the form of open loops into the supplementary fabric part in which they connect the successive open long-drawn loops to each other which are formed of the threads 16a and 16b of the thermoplastic second kind.

Therefore, a fabric of a wavy shape will also be produced in this case as in the case as illustrated in FIGS. 1 to 4. By then stretching this wavy fabric the long-drawn loops will be stretched once more. These stretched long-drawn loops are then set by being heated and cooled. Thereafter the removable threads 17a and 17b are removed with the result that the rigid long-drawn loops will turn to an upright position like plush loops. These erected loops are then fixed in the upright position by being dressed with a sizing material and are thereafter cut open at one side so as to form barbs. Instead of employing the same kind of material for the threads 13a and 13b the threads 13a may be made of a nonelastic material, while the threads 13b which connect different wales to each other consist of an elastic material so as to increase the elasticity of the fabric in its transverse direction.

Figure 6:
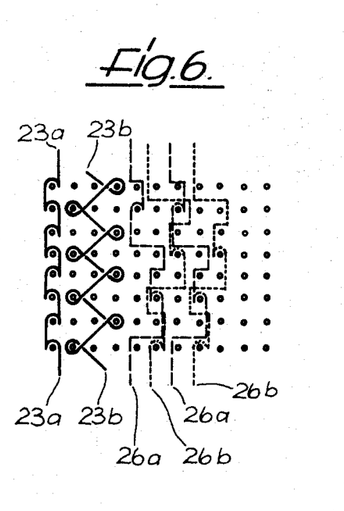
FIGS. 6 and 7 show two patterns for producing knitted fabrics in accordance with two further embodiments of the invention in which weft parts of a combined pillar-stitch and weft insertion are layed around and held by loop holders for forming long-drawn loops for producing the barbs.
Figure 7:
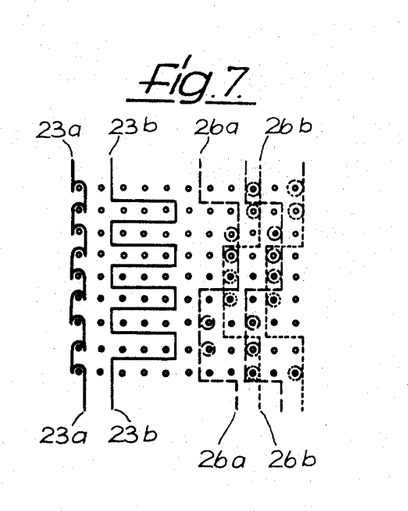

FIGS. 6 and 7 show the patterns of two further fabrics according to the invention which are knitted on a warp knitting machine which has a single needle bar. The base of both of these fabrics consists of two warp-thread systems 23a and 23b, the first of which is knitted in a pillar-stitch arrangement and the second thread system 23b in a manner so as to connect two wales to each other. Knitted into this base fabric are threads of a third and a fourth warp-thread system 26a and 26b of a monofilament thermoplastic second type of thread which are knitted in the form of a combination of pillar stitches and weft insertions. For producing long-drawn loops of these threads 26a and 26b, the machine is equipped with loop holders which guide the weft parts of these threads which extend from one wale to another. These loop holders are disposed outside of the needle row and act during the formation of a larger number of loops of the base fabric upon the number of long-drawn loops which are then formed. Two different embodiments of these loop holders will be hereafter described in connection with the description of two mechanisms with which the knitting methods as illustrated in FIGS. 6 and 7 may be carried out. While these loop holders engage into the long-drawn loops, the latter are set by a heat treatment and are thereafter cut open so as to form barbs. The warp threads 23a which are knitted as pillar stitches may also in this case consist of nonelastic threads and the warp threads 23b which connect the wales of elastic threads so that the fabric will be elastic primarily in its transverse direction.

The two last mentioned embodiments of the invention as illustrated in FIGS. 6 and 7 differ from each other merely by the manner in which the threads 23b connect the wales and by the fact that the warp threads 26a and 26b of which the long-drawn loops are formed according to FIG. 6 are knitted so as to form open loops, while according to FIG. 7 they are knitted in the form of closed loops.

Figures 14, 15:
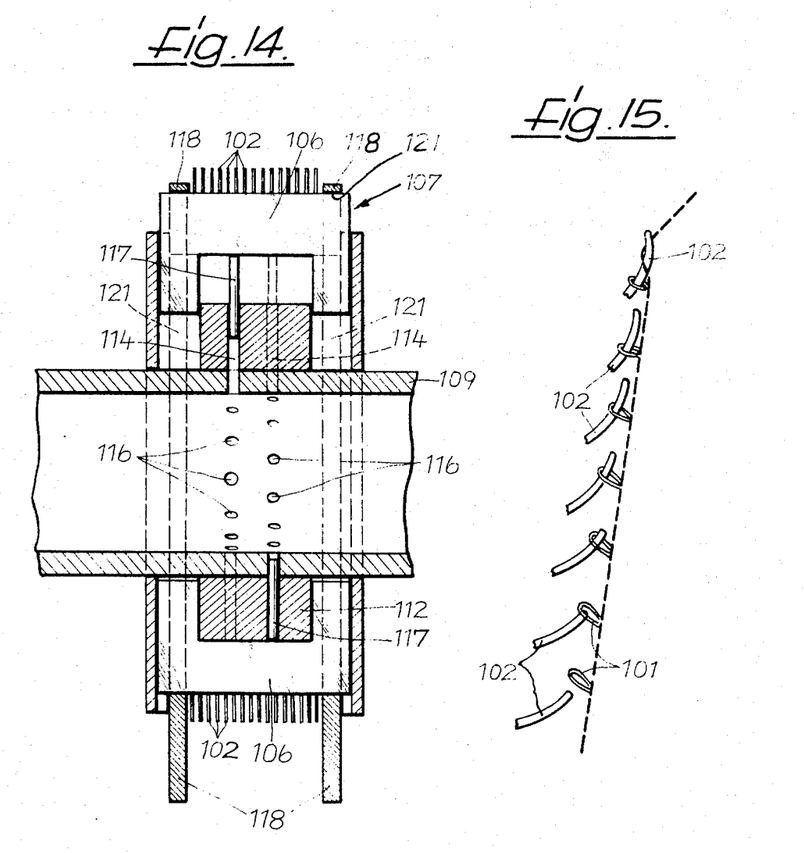
FIG. 14 shows a cross section which is taken along the line XIV—XIV of FIG. 10.
FIG. 15 shows a diagrammatic illustration of the mode of operation of the setting hooks of the mechanism according to FIG. 8 during the knitting of the fabric.

FIGS. 8 to 15 illustrate a first embodiment of a mechanism for carrying out the inventive knitting method in accordance with the patterns as shown in FIGS. 6 and 7. As a loop holder for each loop 101, as indicated in FIG. 15, this mechanism is provided with a separate setting hook 102 which is disposed within the gap intermediate two adjacent needles of the needle bar of a knitting machine and moves along with the knitted material while it is being drawn downwardly and which is therefore in operation while several courses are being knitted. The gap between each pair of adjacent needles of the needle bar of the knitting machine is for this purpose associated with a continuous row of setting hooks 102 which as indicated in FIG. 15, are movable along a prescribed path on which they are guided together with the long drawn loops 101 in such a manner during the formation of several courses that the distance between the adjacent setting hooks 102 gradually increases during their movement.

Figure 9:
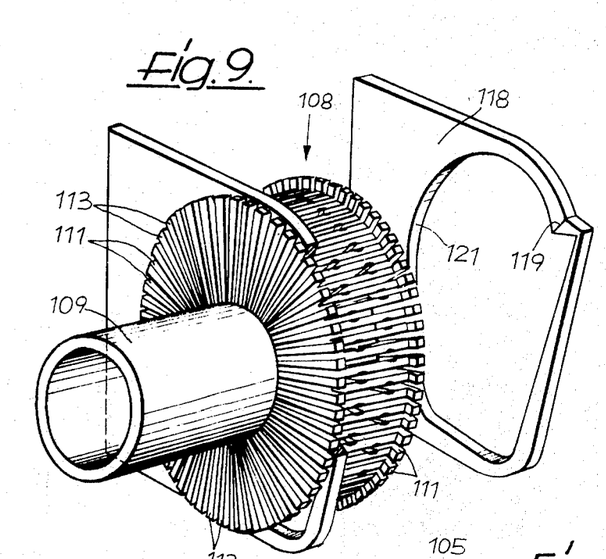
FIG. 9 shows a perspective view of some of the elements of the mechanism as shown in FIG. 8.
Figure 10:
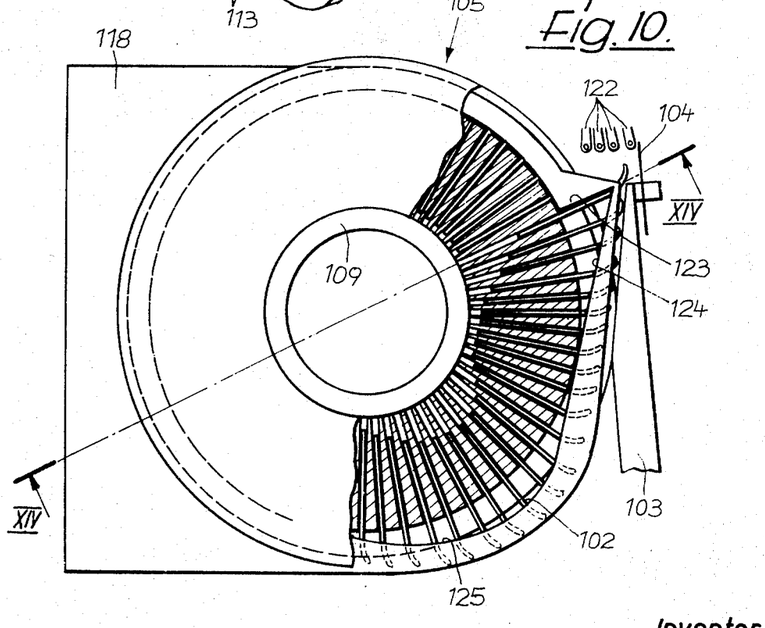
FIG. 10 shows, partly broken away, a side view of the mechanism according to FIG. 8.
Figure 11:
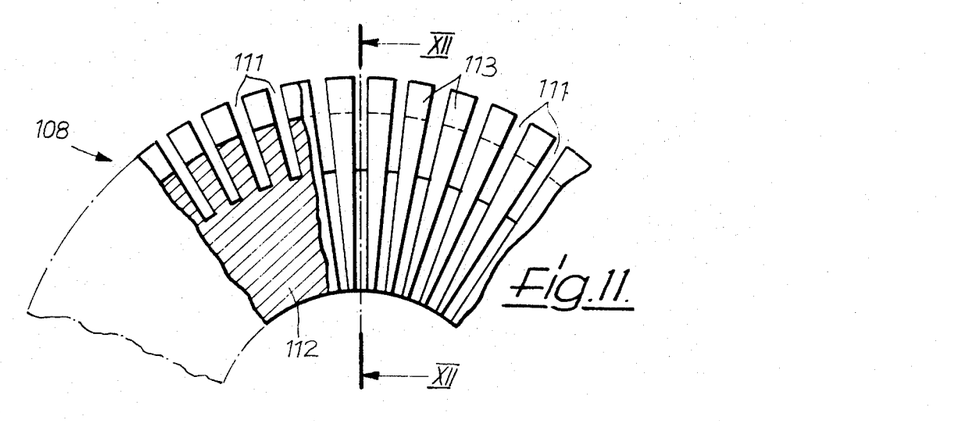
FIG. 11 shows, partly broken away and in section, an enlarged side view of a part of the mechanism as shown in FIG. 8.
Figure 12:
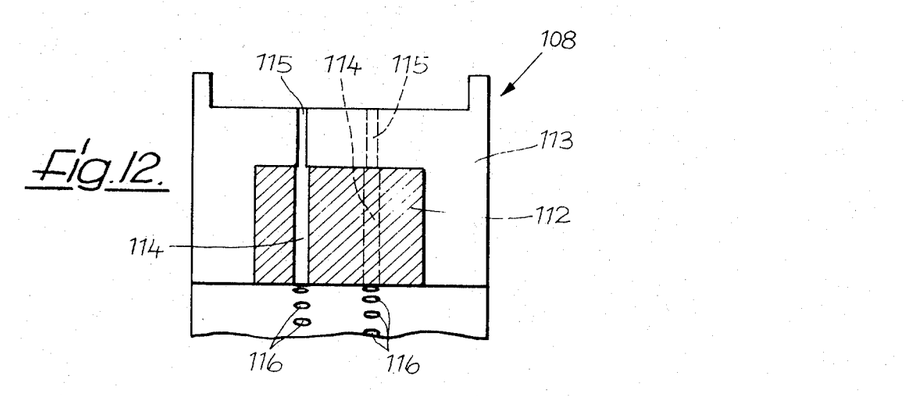
FIG. 12 shows a cross section which is taken along the line XII—XII of FIG. 11.
Figure 13:
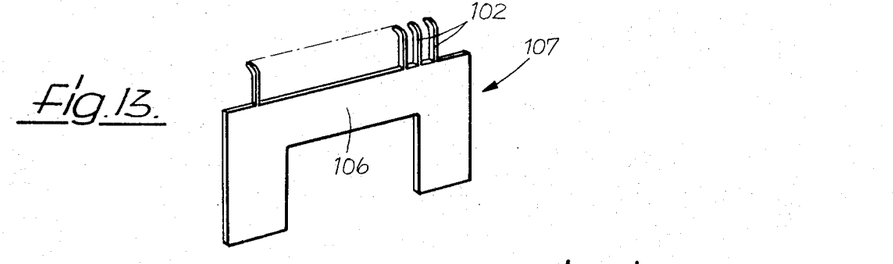
FIG. 13 shows a perspective view of a hook comb of the mechanism according to FIG. 8.

This is effected according to the invention by the provision of a mechanism 105 for supporting and moving the setting hooks 102 which is located adjacent to the comb plate 103 of a conventional warp knitting machine which is provided with a single needle bar, one needle 104 of which is indicated diagrammatically in FIG. 10. The setting hooks 102 which are associated with one course are provided on the central web 106 of a U-shaped comb 107 and the setting hooks of each comb 107 are associated with each second gap between two adjacent needles. In order to provide a setting hook 102 for each needle gap, two different combs 107 are provided the setting hooks 102 of which are laterally offset relative to each other. These combs are mounted on and moved by an annular milled element 108 as illustrated particularly in FIGS. 9 to 11 which is rigidly secured to a rotatable tubular shaft 109, for example, by being shrunk thereon. Along its lateral surfaces and its peripheral surface this annular element 108 is provided with radial grooves 111 in which the combs 107 carrying the setting hooks 102 are guided. These guides grooves 111 are U-shaped like the combs 107 and extend around a solid body 112 of a rectangular cross section which forms the core of the annular element 108, as shown particularly in FIG. 12. The two different combs 107, the setting hooks 102 of which are laterally offset relative to each other, are alternately inserted into the guide grooves 111. The annular element 108 which is milled to the shape as described, therefore consists of a solid core 112 and laminations 113 which form the partitions between the guide grooves 111 and extend from the lateral surfaces and from the periphery of this core and increase in width radially from their inner toward their outer ends. Each part of the core 112 which is disposed between two adjacent laminations 113 is provided with a radial bore 114 the inner end of which terminates into the central axial bore of the shaft 109, while its outer end terminates into a guide groove 111 which forms an extension of the radial bore 114 from its end 116 to the periphery of the annular element 108 in the form of a groove 115 which extends radially within each of the adjacent laminations. As indicated in FIG. 12, the radial bores 114 which are associated with adjacent guide grooves 111 are axially offset relative to each other so that their ends 116 will not intersect.

Figure 8:
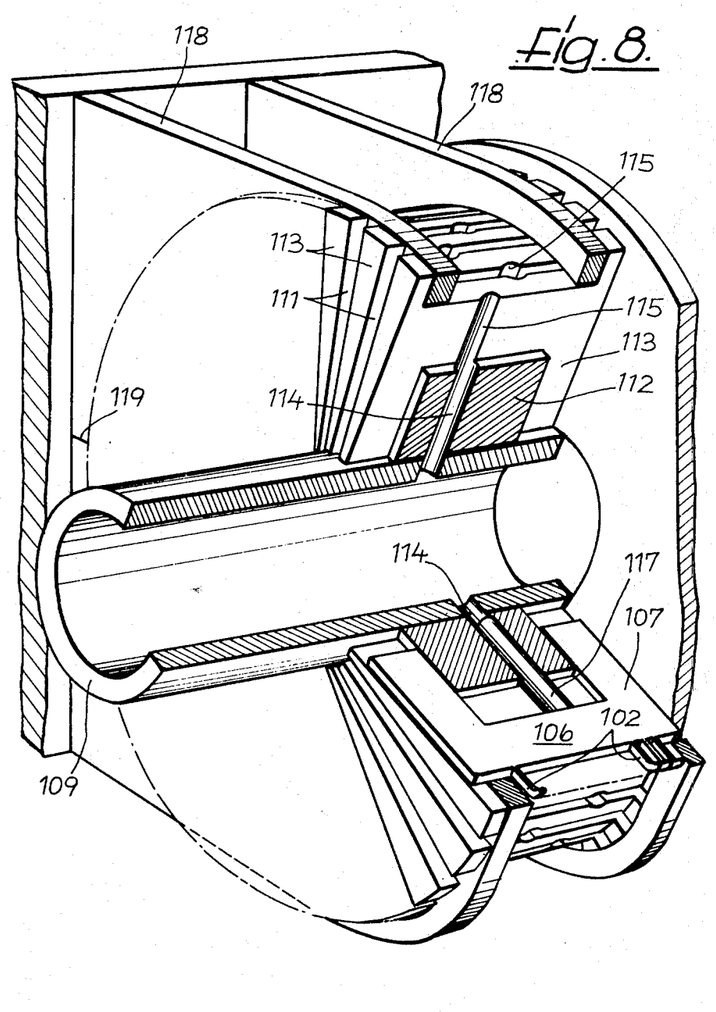
FIG. 8 shows diagrammatically and partly broken away and in section a perspective view of a mechanism which is to be employed with warp knitting machine for knitting a fabric in accordance with the patterns as shown in FIG. 6 and FIG. 7.

The axial bore of the tubular shaft 109 is connected in a manner not illustrated to a suitable source of oil under pressure. As shown in FIG. 8, each radial bore 114 serves as a cylinder in which a piston 117 is slidable the radially outer end of which engages into the guide groove 111 in which it acts upon the central web of the setting-hook comb 107 which is movable in and guided by the walls of this groove. The oil pressure which acts through the axial bore of the tubular shaft 109 upon the pistons 117 therefore presses the combs 107 radially in the outward direction. In order to prevent these combs from being forced entirely out of the guide grooves 111, the annular element 108 is surrounded by a pair of plates 118 each of which, as shown by the dividing lines 119 in FIGS. 8 and 9, is composed of two parts which together define an inner guide surface 121 (FIG. 9) for the combs 107. The peripheral surface of the annular element 108 is for this purpose provided with a groove which extends almost across the entire width of this element and into which the inner edges of the plates 118 engage so that the guide surfaces 121 face directly the webs 106 of the combs 107. The guide surfaces 121 engage with the base of the peripheral groove of the annular element 108 up to the position at the upper end of the comb plate 103 (FIG. 10). The combs 107 are therefore held in their radially lowest position. At the above-mentioned position in which the loops are formed by overlapping, the guide surfaces 121 are provided with a rectangular step 123 (FIG. 10) and underneath this step with a straight part 124 which extends tangentially to the base of the peripheral groove in the annular element 108 and at the lower end of which the guide surface 121 again curves back up to the base of the peripheral groove. The tubular shaft 109 is connected to suitable driving means, not shown, for rotating it at such a speed in the clockwise direction as seen in FIG. 10 that the peripheral speed of the annular element 108 corresponds substantially to the medium speed at which the fabric is produced which is knitted on the knitting machine, so that when the fabric is being withdrawn, the setting hooks 102 are moved together with the loops 101 thereon and therefore remain hooked into the loops during their entire movement along the straight part 124 of the guide surface 121 and thereby stretch out these loops. As may be seen especially in FIGS. 10 and 15, the distance between the setting hooks 102 increases continuously during this movement so that shortly before they reach the curved part 125 of the guide surface 121 the setting hooks will be pulled out of the loops 101.

For setting the loops 101 while they are drawn out by the setting hooks 102, the apparatus is heated by passing hot oil into the axial bore of the tubular shaft 109. The setting hooks 102 may thus be maintained at all times at the temperature which is required for setting the long-drawn loops 101.

Figure 16:
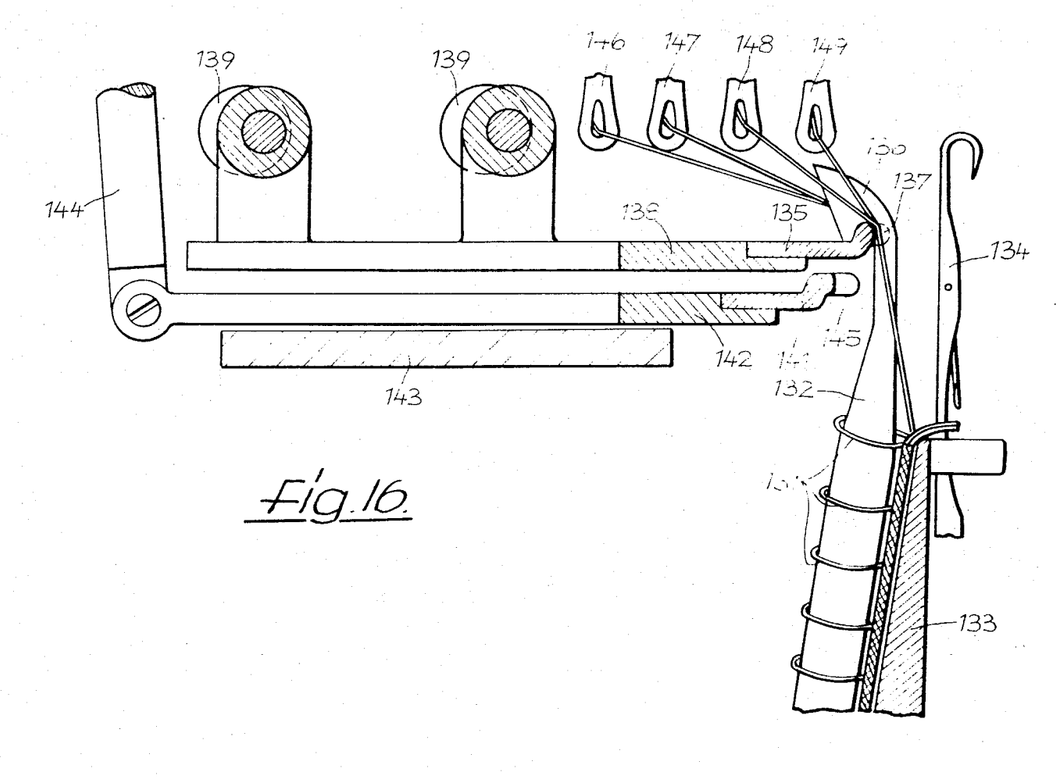
FIG. 16 shows diagrammatically simplified and partly in section a side view of a second embodiment of the mechanism for producing the knitted fabric in accordance with the pattern as shown in FIG. 6 or in FIG. 7.
Figure 17:
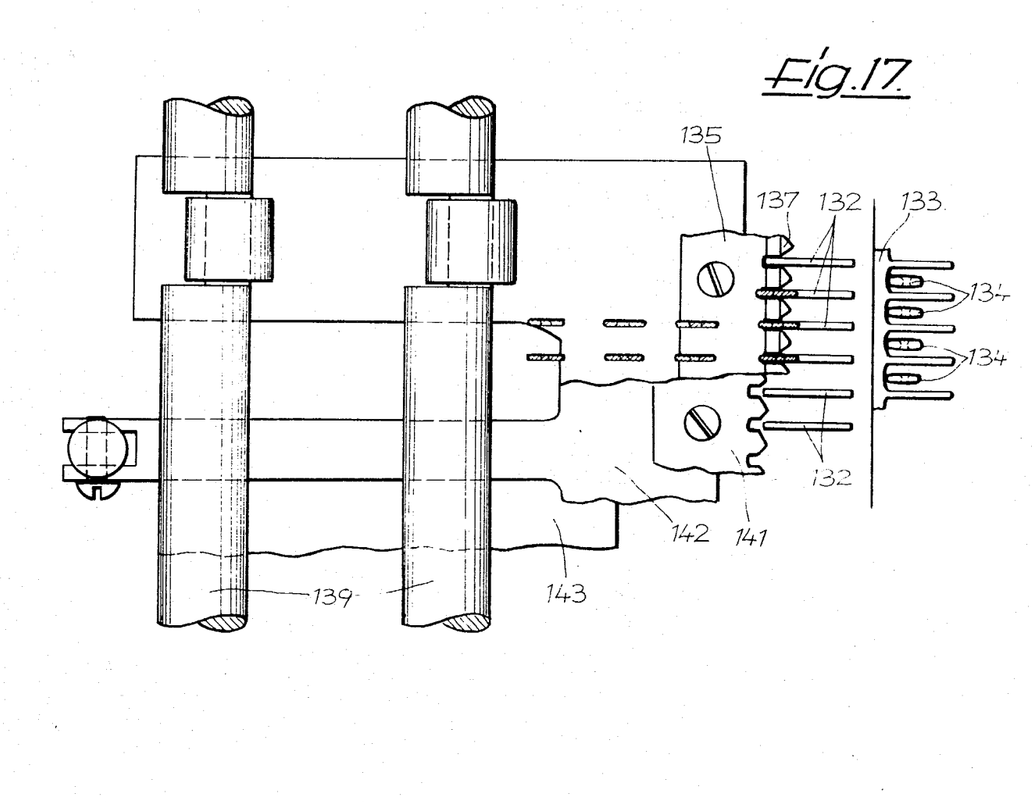
FIG. 17 shows a top view of the mechanism according to FIG. 16.

FIGS. 16 and 17 illustrate a further embodiment of a mechanism for a warp knitting machine by means of which the inventive method may be carried out in accordance with either of the knitting patterns as shown in FIGS. 6 and 7. The loop holders which are provided in this mechanism for holding the long-drawn loops 131 consist of metal lancets 132 which are held by the loop 131 in a row adjacent to the comb plate 133 and parallel to the row of needles 134 of the needle bar. As illustrated in FIG. 17, each of these lancets 132 extends within a plane which is disposed between two adjacent needles 134 and vertically to the row of needles 134. For holding these lancets 132 during the period in which the old loops are knocked over, a holding device is provided which comprises a first holding comb 135 which, while the old loops are knocked over, engages with the lower side of a hook-shaped upper end 136 of each lancet while its teeth 137 at the same time embrace the sides of this end. The holding comb 135 is secured to a supporting member 138 which is eccentrically mounted on two shafts 139 which are driven by the driving means of the knitting machine. These shafts are connected in such a manner to the driving means of the knitting machine that the first holding comb 135 will always engage underneath the ends 136 of the lancets when the old loops are being knocked over so that during this period the lancets 132 cannot change their position.

Underneath this first holding device the mechanism as illustrated in FIGS. 16 and 17 is provided with a second holding device which comprises a second holding comb 141 which is secured to a supporting member 142 which is movable back and forth on a plate 143 by a lever 144 which, in turn, is moved back and forth by a cam mechanism which is driven by the driving means of the knitting machine. This cam mechanism is connected in such a manner to the driving means of the knitting machine that the teeth 145 of the second holding comb 141 will laterally embrace the lancets 132 when the first holding comb 135 has released the lancets. Consequently, the lancets 132 cannot be shifted in lateral directions as the result of the lateral stresses which occur during the knitting operation and the loops which are layed around the ends 136 of the lancets can always be drawn downwardly alternately first past the first holding comb 135 while the lancets are released by the latter and then past the second holding comb 141 while the lancets are released by this second comb.

FIG. 16 illustrates the mechanism in the position in which the old loop which is shown as being laid as the uppermost around the lancet 132 has just been tied into the base fabric. By means of the needle 148 of the guide needles 146 to 149 a thread is just being layed around the upper end 136 of the lancet 132, whereupon all guide needles 146 to 149 are moved toward the right of the needle 134. During the overlapping the lancet 132 is released from the first holding comb 135 and held by the second holding comb 141. When the needle bar with the needles 134 is thereafter drawn downwardly in order to draw the new loop through the old loop, the guide needles 146 to 149 will move from the position at the right side of the needle 134 to the position as shown in FIG. 16 at the left side behind the needle, and the holding comb 135 will be moved obliquely upward underneath the end 136 of the lancets 132 so as to hold the latter in a fixed position while the old loop is being knocked over. At the same time, the lancets will be released from the second holding comb 141. The newly formed loops 131 which are drawn out to a considerable length by the lancets 132 may thus move downwardly along the latter and may during this and the subsequent downward movement be solidified by being set by a heat treatment by means of an additional heating device, not shown.

Figure 18:
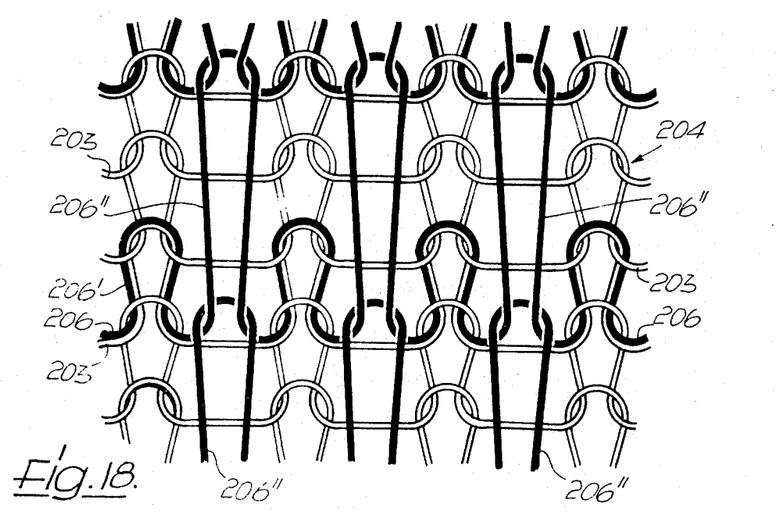
FIG. 18 shows a loop formation of a knitted fabric which is provided with a wavy shape and is produced in accordance with the invention.
Figure 19:
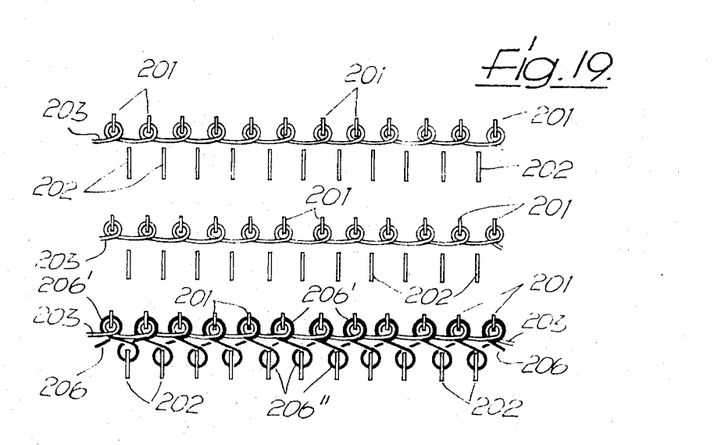
FIG. 19 shows a pattern for knitting the fabric as shown in FIG. 18.
Figures 20, 21, 22, 23:
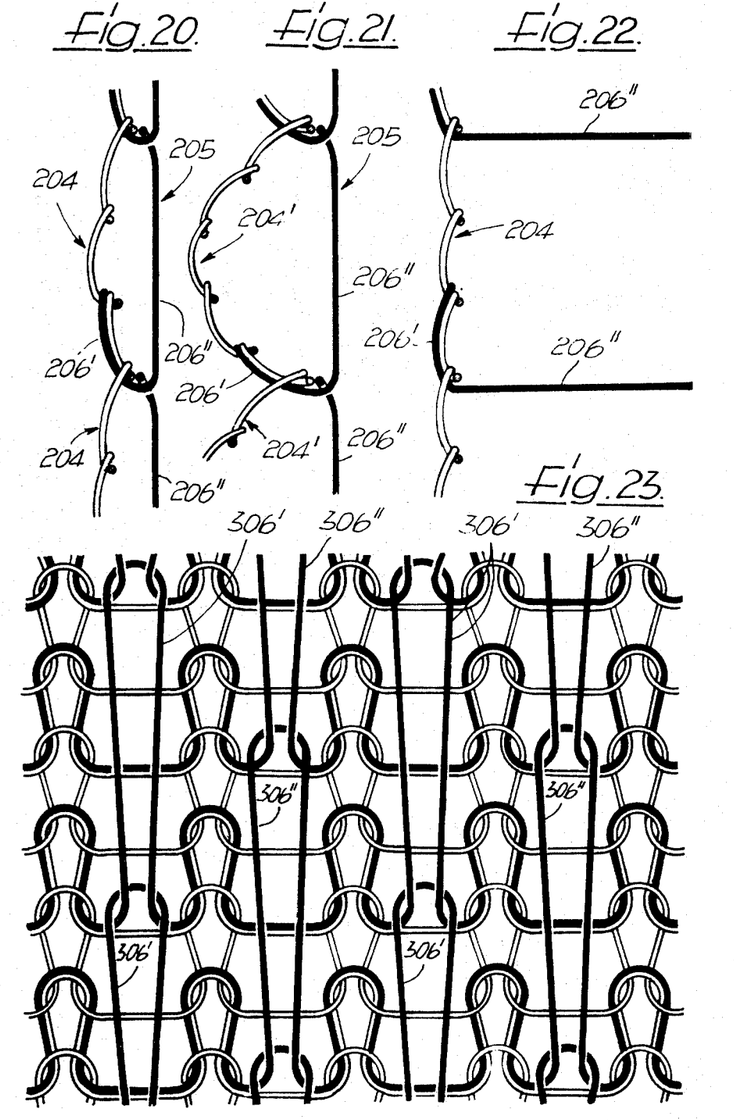
FIG. 20 shows a diagrammatically simplified section which is taken along the wales of the fabric as shown in FIG. 18.
FIG. 21 shows a section similar to that as shown in FIG. 20 of a modification of the knitted fabric as shown in FIG. 18.
FIG. 22 shows a section similar to that as shown in FIG. 20 of the knitted fabric which is produced in accordance with the invention from a fabric as shown in FIG. 18.
FIG. 23 shows a modification of the loop formation as shown in FIG. 18 for producing a fabric which is likewise provided with upwardly projecting hooks.

In the knitting pattern as shown in FIG. 19, the dial needles which are guided in the grooves of the dial of a circular knitting machine are designated by the numeral 201 and the cylinder needles which are guided in the grooves of the cylinder of this machine by the numeral 202. By means of a multifilament thread 203 a uniform one-face base fabric 204 as shown in FIGS. 20 and 21 is knitted on the dial needles 201 and this base fabric 204 is connected to a supplementary fabric part 205 which consists of a thermoplastic thread 206. By forming normal loops 206′ which are disposed in the wales of the base fabric 204 this thermoplastic thread 206 is connected to the base fabric 204 by means of the dial needles 201. The wales of the supplementary fabric part 205 which are formed by the cylinder needles 202 are disposed between each pair of adjacent wales of the base fabric 204, and the thread 206 then forms loops 206″ which extend over three courses of the base fabric 204. The successive longdrawn loops 206″ which are formed of the thermoplastic thread 206 within each wale of the supplementary fabric part 205 are connected to each other, so that, as shown especially by FIG. 20, a wavy design is formed in which the base fabric 204 forms the wave crests which are curved by the long-drawn loops 206″ of the supplementary fabric part 205. FIG. 18 shows diagrammatically a loop formation of the knitted fabric which is thus produced in which the base fabric 204 is seen from the back on which the supplementary fabric part 205 is knitted which faces upwardly from the drawing.

The knitted fabric which is thus produced is stretched in the longitudinal direction of the wales. By this operation the long-drawn loops 206″ of the thermoplastic thread 206 will be stretched, as shown particularly in FIG. 20, and since these loops are tied to each other, especially their heads will be drawn together to a small width which is especially of importance for forming the barbs. When in this stretched position the thermoplastic thread 206 will be set in the long-drawn position of its loops 20″ by being heated and subsequently cooled.

After the long-drawn loops 206″ have thus been set, a course of these loops at the last-knitted end of the fabric is destroyed, for example, by cutting these loops. The entire fabric is then once more stretched in the longitudinal direction of the wales so that at first the course of long-drawn loops 206″ which directly follows the course which has been cut will be pulled out of the course of cut loops and will thereby turn up to an erect position so that the long-drawn loops of the next following course will then be pulled out of the erected loops and be likewise turned to an erect position. This effect continues during the stretching of the fabric in the same manner as it occurs when a run is formed in a conventional knitted fabric so that the loop connection within all wales of the long-drawn loops 206″ will be severed by the formation of runs. The long-drawn loops 206″ after being set and then erected so as to form plush or terry loops, as shown diagrammatically in FIG. 22, are then fixed in their upright position by a sizing material and are then cut open in a conventional manner so as to form barbs.

For insuring that the loop connection within all wales of the long-drawn loops will be severed by the formation of runs in the manner as previously described, it is necessary to provide the base fabric 204 with such a degree of elasticity that the long-drawn loops of each course may be pulled out of the free erected loops of the preceding course. This elasticity may be attained according to FIGS. 18 to 20 by knitting the base fabric 204 of an elastic thread 203 which may be of a conventional type and the elasticity of which may, for example, be produced by the use of rubber, crimp yarn or the like.

As illustrated in FIG. 21, it is, however, also possible to attain the required elasticity of the base fabric 204′ by knitting each wave of the latter which covers a course of long-drawn loops 206″ so as to be considerably longer than these loops. This may be attained according to FIG. 21 by making each wave of five courses rather than of only three courses as shown in FIG. 20. The thread 203 of the base fabric does in this case not have to consist of an elastic material.

Figure 24:
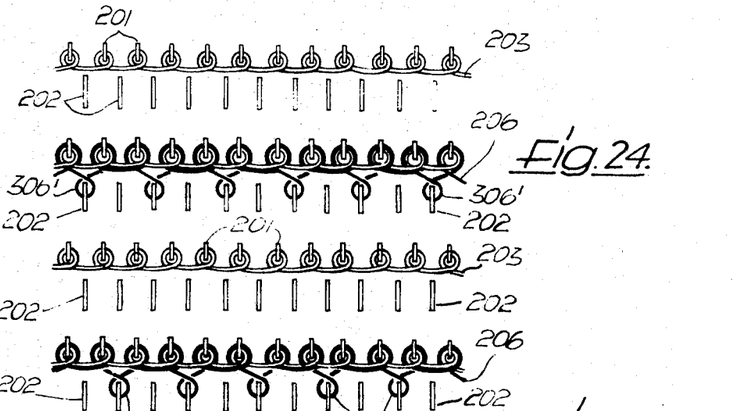

The knitted fabric as illustrated in FIGS. 23 and 24 from which a fabric with projecting barbs in accordance with the invention is to be produced differs from the fabric as previously described merely by the fact that each course of long-drawn loops 306′ and 306″ is formed by each second cylinder needle 202 so that these loops of adjacent courses and wales of the supplementary fabric part overlap each other.

Figure 25:
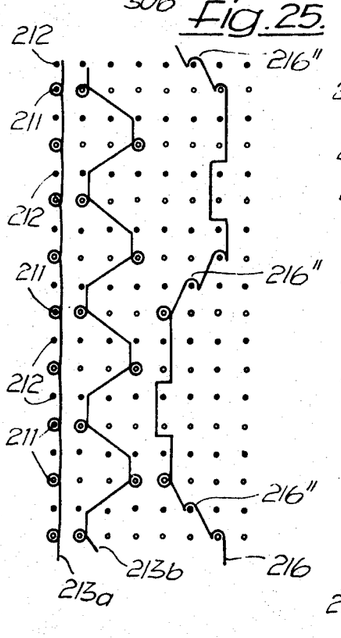
FIGS. 25 and 26 show two further patterns produced on a warp knitting machine for knitting two further fabrics from each of which a fabric may be produced which is provided with projecting hooks.
Figure 26:
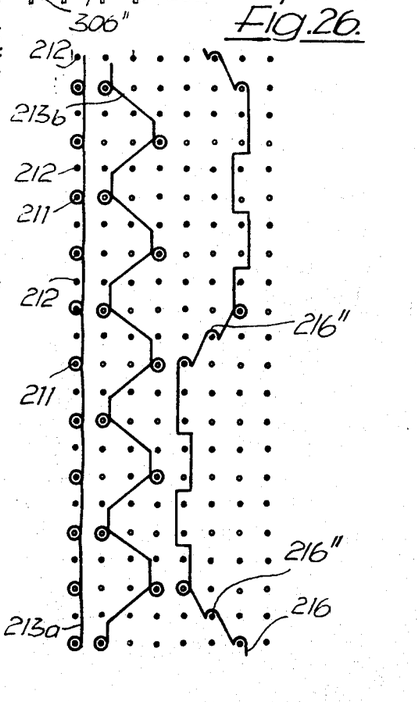

The method according to the invention may also be applied to a knitted fabric in the manner as illustrated in FIGS. 25 and 26 which is produced by means of a warp knitting machine which is provided with two needle bars. By means of the needles 211 of the first needle bar a multifilament-type of thread is also employed in this case for producing a base fabric with a pillar stitch formation of a thread 213a and a second thread 213b of the same kind which connects two different wales. By means of the needles 211 of the first needle bar and the needles 212 of the second needle bar a thermoplastic thread 216 is knitted so as to produce a supplementary fabric part in which the long-drawn loops 216″ are formed by omitting the overlapping of the thread around the needles 212 of the second needle bar and by omitting the actuation of the second presser bar. This may also be effected by omitting the operation of the second needle bar so as to form the long-drawn loops. In both cases the successive long-drawn loops 216″ of the thermoplastic thread 216 will then be connected to each other. In this manner a wavy design similar to that of the knitted fabric as above described will be formed in which the base fabric which is knitted by the needles 211 of the first needle bar forms the wave crests which are curved by the long-drawn loops 216″ of the supplementary fabric part. Since the thread 216 for producing the long-drawn loops 216″ is knitted into the base fabric, the elasticity of the base fabric is limited. Therefore, the threads 213a and 213b for the base fabric according to FIGS. 25 and 26 are made of a nonelastic material. However, the long-drawn loops 216″ then extend over a larger number of loops of the base fabric, for example, in the embodiment as illustrated over four loops, so that the base fabric will thereby be provided with relatively long waves which render the base fabric very elastic only for the purpose of severing the loop connections.

After the knitting of the fabric according to FIGS. 25 and 26 has been completed, this fabric is treated in exactly the same manner as the fabric previously described by first stretching the fabric and then setting the long-drawn loops 216″. After this operation, the long-drawn loops of the last-knitted course are destroyed, for example, by being cut. Thereafter, the fabric is stretched in the longitudinal direction of the wales so that the loop connection within all of the wales of the long-drawn loops will be severed by the formation of runs. Finally, these loops after being set and erected so as to form plush or terry loops are fixed in this erect position by being dressed with a sizing material and are thereafter cut open at one side so as to form the desired barbs.

Although this invention has been illustrated and described with reference to the preferred embodiments thereof, it should be understood that it is in no way limited to the details of such embodiments, but is capable of numerous modifications within the scope of the appended claims.

This invention having thus been fully disclosed, what is being claimed is:

1. A knitted hooked-pile fabric comprising a base fabric formed by a plurality of wales and courses and a plurality of upstanding heat set and fixed plush loops of monofilament thermoplastic threads, said plush loops having each a pair of bent feet which is knitted into immediately adjacent wales of the base fabric, each of said plush loops having one of its limbs severed to form a hook, the improvement comprising the pair of feet of each plush loop being curved and knitted into the same course of said base fabric and being situated substantially in the plane formed by the plush loops, said pair of limbs of the plush loops being substantially parallel to each other along their entire length.

2. A knitted fabric as defined in claim 1, in which said base fabric consists of elastic and nonelastic threads and said barbs are connected by said nonelastic threads to said base fabric.

3. A knitted fabric as defined in claim 1, in which said base fabric consists of at least two warp-thread systems one of which forms a pillar-stitch formation and the other a connection between different wales, and at least one third warp-thread system knitted into the first two systems and forming a combination of a pillar stitch formation and weft insertion, each weft part of said third series crossing from one wale of said base fabric to another having ends not connected by loops to said base fabric, while the part intermediate said ends forms one of said long-drawn loops, said loops being laterally cut open so as to form barbs.

4. A knitted fabric as defined in claim 3, in which for forming the barbs at least two warp-thread systems are provided which are knitted into said base fabric in the form of a combination of pillar-stitch formations and weft insertions.

References Cited

UNITED STATES PATENTS

| | | | |
|---|---|---|---|
| 3,539,436 | 11/1970 | Hamand | 161—89 |
| 2,959,947 | 11/1960 | MacCaffray, Jr. | 66—193 X |
| 2,968,171 | 1/1961 | MacCaffray, Jr. | 66—193 X |
| 3,090,097 | 5/1963 | Ruckstohl | 161—65 X |
| 3,530,687 | 9/1970 | Hamand | 66—86 X |

FOREIGN PATENTS

| | | | |
|---|---|---|---|
| 1,539,997 | 8/1968 | France | 66—86 |

ROBERT F. BURNETT, Primary Examiner

R. O. LINKER, JR., Assistant Examiner

U.S. Cl. X.R.

28—72 P; 66—84, 194; 161—65